(12) United States Patent
Noh et al.

(10) Patent No.: US 11,875,036 B2
(45) Date of Patent: Jan. 16, 2024

(54) COMPUTING SYSTEM INCLUDING HOST AND STORAGE SYSTEM AND HAVING INCREASED WRITE PERFORMANCE

(71) Applicant: SAMSUNG ELECTRONICS CO., LTD., Suwon-si (KR)

(72) Inventors: Sunghyun Noh, Seoul (KR); Byungki Lee, Hwaseong-si (KR); Junhee Kim, Suwon-si (KR); Keunsan Park, Suwon-si (KR); Jekyeom Jeon, Siheung-si (KR); Jinhwan Choi, Seoul (KR); Jooyoung Hwang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 70 days.

(21) Appl. No.: 17/566,309

(22) Filed: Dec. 30, 2021

(65) Prior Publication Data
US 2022/0221987 A1 Jul. 14, 2022

(30) Foreign Application Priority Data

Jan. 13, 2021 (KR) .......... 10-2021-0004937
Jun. 16, 2021 (KR) .......... 10-2021-0078288
Dec. 29, 2021 (KR) .......... 10-2021-0191117

(51) Int. Cl.
*G06F 3/06* (2006.01)
(52) U.S. Cl.
CPC .......... *G06F 3/0608* (2013.01); *G06F 3/0655* (2013.01); *G06F 3/0679* (2013.01)

(58) Field of Classification Search
CPC .... G06F 3/0608; G06F 3/0655; G06F 3/0679; G06F 3/0619; G06F 3/0643; G06F 3/0688
See application file for complete search history.

(56) References Cited

U.S. PATENT DOCUMENTS

| 7,679,133 B2 | 3/2010 | Son et al. |
| 7,877,539 B2 | 1/2011 | Sinclair et al. |
| 8,037,112 B2 | 10/2011 | Nath et al. |

(Continued)

FOREIGN PATENT DOCUMENTS

| JP | 2008-530710 | 8/2008 |
| JP | 2018-169773 | 11/2018 |

(Continued)

OTHER PUBLICATIONS

ESSR dated Jun. 22, 2022 corresponding to EP Patent Application No. 22150729.6.

(Continued)

*Primary Examiner* — Jane W Benner
(74) *Attorney, Agent, or Firm* — F. Chau & Associates, LLC

(57) ABSTRACT

A computing system includes a storage system configured to store data, and a host configured to compress a data block of a preset size loaded to a memory, generate a merged block of the preset size by merging a compressed block corresponding to the data block, an identifier of a node block referring the data block, and an offset indicating an index of the data block among at least one data block referred by the node block, and provide the merged block to the storage system.

20 Claims, 13 Drawing Sheets

(56) References Cited

U.S. PATENT DOCUMENTS

| | | | |
|---|---|---|---|
| 8,429,352 B2 | 4/2013 | Sinclair | |
| 8,553,466 B2 | 10/2013 | Han et al. | |
| 8,559,235 B2 | 10/2013 | Seol et al. | |
| 8,654,587 B2 | 2/2014 | Yoon et al. | |
| 9,201,787 B2 | 12/2015 | Lee et al. | |
| 9,424,262 B2 | 8/2016 | Hwang et al. | |
| 9,477,682 B1 | 10/2016 | Bent et al. | |
| 9,779,023 B1 | 10/2017 | Armangau et al. | |
| 10,007,617 B2 | 6/2018 | Choi | |
| 10,613,756 B2 | 4/2020 | Shin et al. | |
| 10,901,660 B1 * | 1/2021 | Frandzel | G06F 21/78 |
| 2011/0233648 A1 | 9/2011 | Seol et al. | |
| 2013/0314429 A1 * | 11/2013 | Croxford | G09G 5/393 |
| | | | 345/531 |
| 2015/0339228 A1 | 11/2015 | Heddes et al. | |
| 2018/0088812 A1 * | 3/2018 | Lee | G06F 3/064 |
| 2019/0235759 A1 | 8/2019 | Sen et al. | |
| 2019/0243758 A1 | 8/2019 | Takeda et al. | |
| 2022/0129162 A1 * | 4/2022 | Faibish | G06F 3/067 |

FOREIGN PATENT DOCUMENTS

| | | |
|---|---|---|
| KR | 10-2010-0034743 | 4/2010 |
| KR | 10-2014-0042426 | 4/2014 |
| KR | 10-1413985 | 6/2014 |
| KR | 10-2015-0038308 | 4/2015 |
| KR | 10-2018-0034079 | 4/2018 |
| KR | 10-2018-0048938 | 5/2018 |
| KR | 10-2019-0094098 | 8/2019 |

OTHER PUBLICATIONS

EESR dated Jun. 22, 2022 corresponding to EP Patent Application No. 22150729.6.

\* cited by examiner

| NID | ADDRESS |
|---|---|
| N1 | A1 |
| N2 | A2 |
| N3 | A3 |

NODE ADDRESS TABLE (NAT) —— 65

COMPUTING SYSTEM INCLUDING HOST AND STORAGE SYSTEM AND HAVING INCREASED WRITE PERFORMANCE

CROSS-REFERENCE TO RELATED APPLICATIONS

This application is based on and claims priority under 35 U.S.C. § 119 to Korean Patent Application No. 10-2021-0004937 filed on Jan. 13, 2021, and Korean Patent Application No. 10-2021-0078288 filed on Jun. 16, 2021, and Korean Patent Application No. 10-2021-0191117 filed on Dec. 29, 2021, the disclosures of which are incorporated by reference herein in their entireties.

TECHNICAL FIELD

Embodiments of the inventive concept relate to a computing system, and more particularly, to a computing system including a host and a storage system.

DISCUSSION OF RELATED ART

A file system, such as the extended file system 4 (EXT4), overwrites new data to the original location when random data is updated. This is referred to as an in-place-update scheme. A log-structured file system (LFS) uses an out-of-place update scheme that invalidates old data and writes new data to another location.

SUMMARY

Embodiments of the inventive concept relate to a computing system, and provides a computing system having increased write performance by writing a merged block into which a compressed data block, a node identifier, and an offset are merged, asynchronously with a node block.

According to an aspect of the inventive concept, there is provided a computing system including a storage system configured to store data and a host configured to compress a data block of a preset size loaded to a memory, generate a merged block of the preset size by merging a compressed block corresponding to the data block, an identifier of a node block referring the data block, and an offset indicating an index of the data block among at least one data block referred by the node block, and provide the merged block to the storage system.

According to an aspect of the inventive concept, there is provided a host device that writes data to a storage system, the host device including a memory that stores data to be written to the storage system or data read from the storage system, a compression manager configured to compress a data block of a preset size loaded to the memory, and a file system configured to receive a compressed block corresponding to the data block from the compression manager, generate a merged block by merging the compressed block, an identifier of a node block referring the data block, and an offset indicating an index of the data block among at least one data block referred by the node block, and write the merged block to the storage system.

According to an aspect of the inventive concept, there is provided a computing system including a universal flash storage (UFS) system including a plurality of storage regions and a UFS host configured to store a merged block into which a compressed block in which a data block is compressed, an identifier of a node block referring the data block, and an offset indicating an index of the data block among at least one data block referred by the node block are merged, in a first storage region among the plurality of storage regions, and store a node block indicating the address of the data block in a second storage region among the plurality of storage regions.

BRIEF DESCRIPTION OF THE DRAWINGS

Embodiments of the inventive concept will be more clearly understood from the following detailed description taken in conjunction with the accompanying drawings, in which.

DETAILED DESCRIPTION OF THE EMBODIMENTS

Figure 1:
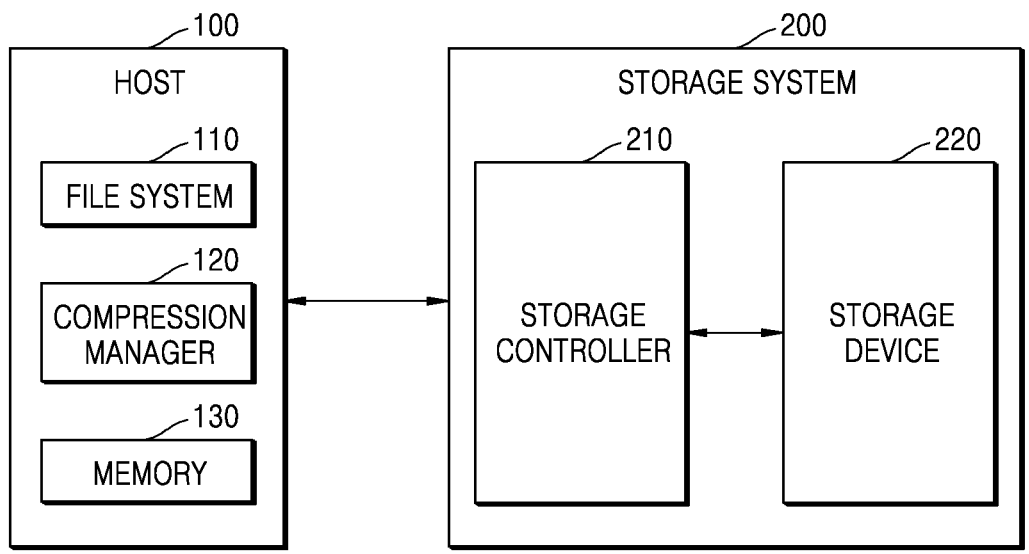
FIG. 1 is a diagram of a computing system according to an embodiment of the inventive concept.

Embodiments of the inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

Herein, when one value is described as being about equal to another value or being substantially the same as or equal to another value, it is to be understood that the values are identical, the values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art.

FIG. 1 is a diagram of a computing system according to an embodiment of the inventive concept.

Referring to FIG. 1, a computing system 10 may include a host 100 and a storage system 200.

The host 100 may provide a write request, a read request, or an erase request for data to the storage system 200. The storage system 200 may store data in a storage region in response to the write request, read data stored in the storage region and provide the read data to the host 100 in response to the read request, and perform an erase operation on the data in response to the erase request. The data may be stored or read in the unit of a preset block (e.g., 4 KB).

The host 100 may include a file system 110. The file system 110 may process the data such that the data may be stored in a particular logical or physical location in storage regions included in the storage system 200. For example, the file system 110 may process data provided from a user application and store the processed data in the storage system 200.

In this case, in an embodiment, the file system 110 may be a log-structured file system (LFS). For example, the file system 110 may be a flash-friendly file system (F2FS) that is a file system for a Linux kernel designed according to flash memory characteristics, or a journaling flash file system (JFFS) that is a Linux LFS used in a NOR flash memory device.

However, the type of the file system 110 is not limited to LFS, and embodiments of the inventive concept may be applied to any file system of a type in which new data is written to a logical address that is different from a logical address to which existing data is written, when a file is updated.

The storage system 200 may include a storage controller 210 and a storage device 220. The storage device 220 may include at least one non-volatile memory. The storage controller 210 may convert a logical address received from the host 100 into a physical address and control the storage device 220 to store data in a storage region having the physical address.

The storage system 200 may include storage media in which data is stored in response to a request from the host 100. For example, the storage system 200 may include one or more solid state drives (SSDs). When the storage system 200 includes SSDs, the storage device 220 may include multiple flash memory chips (e.g., NAND memory chips) that store data in a non-volatile manner. The storage device 220 may correspond to one flash memory device, or the storage device 220 may include a memory card including one or more flash memory chips.

When the storage system 200 includes a flash memory, the flash memory may include a two-dimensional (2D) NAND memory array or a three-dimensional (3D) (or vertical) NAND (VNAND) memory array. The 3D memory array may be formed monolithically in arrays of memory cells having active regions arranged on a silicon substrate or at least one physical level of a circuit related to operations of the memory cells and formed on or in the substrate. The term "monolithic" means that layers of each level constituting the array are stacked immediately on layers of each lower level of the array.

In an embodiment of the inventive concept, the 3D memory array may include VNAND strings arranged vertically such that at least one memory cell is located on another memory cell. The at least one memory cell may include a charge trap layer.

In another example, the storage system 200 may include other various types of memories. For example, the storage system 200 may include non-volatile memory such as, for example, magnetic random access memory (MRAM), spin-transfer torque MRAM, conductive bridging RAM (CBRAM), ferroelectric RAM (FeRAM), phase RAM (PRAM), resistive RAM, nanotube RAM, polymer RAM (PoRAM), nano floating gate memory (NFGM), holographic memory, molecular electronics memory, insulator resistance change memory, etc.

For example, the storage device 220 may include an embedded multi-media card (eMMC) or an embedded universal flash storage (UFS) memory device. In an example, the storage device 220 may be external memory detachably attached to the storage system 200. For example, the storage device 220 may include, but is not limited to, a UFS memory card, a compact flash (CF) card, secure digital (SD) card, a microSD card, a miniSD card, an extreme digital (xD) card, or a memory stick.

The host 100 may communicate with the storage system 200 through various interfaces. For example, the host 100 may communicate with the storage system 200 through various interfaces such as universal serial bus (USB), multimedia card (MMC), PCI-express (PCI-E), AT attachment (ATA), serial AT attachment (SATA), parallel AT attachment (PATA), small computer system interface (SCSI), serial attached SCSI (SAS), enhanced small disk interface (ESDI), interchanged drive electronics (IDE), non-volatile memory express (NVMe), etc.

The host 100 may transmit a write request (or a write command) for new data to the storage system 200 when data of a random file is updated with the new data.

Herein, data provided to the file system 110 from the user application may be referred to as file data. The file data may be stored in the storage system 200 in the unit of a preset block (e.g., 4 KB), and the file data in the unit of a block may be referred to as a data block. The file data may include a plurality of data blocks.

The file system 110 may generate a node block corresponding to the data block. The node block may include information about the data block. For example, the node block may include a name of a file, a node identifier, a size of the file, or a logical address of the data block. In an embodiment, the name of the file refers to a name of the file formed of the data block, the node identifier is a unique identifier for the node block, and the size of the file refers to the size of the file formed of the data block. A node block may refer the plurality of data blocks, and each of the plurality of data blocks may be identified based on an offset.

The node block may be stored in the storage system 200 in the unit of a preset block (e.g., 4 KB). For example, the node block may be used to find a location of the data block. For example, the file system 110 may allocate a node identifier to each node block. The file system 110 may manage a node identifier and a logical address corresponding to the node identifier through a node address table (NAT). The file system 110 may access a node block through the NAT and access a data block by identifying a logical address of the data block, stored in the node block.

The host 100 according to an embodiment of the inventive concept may include a compression manager 120. The compression manager 120 may generate a compressed block by compressing the data block. The file system 110 may generate a block in a preset unit (e.g., 4 KB) by merging the compressed block, the node identifier of the node block corresponding to the data block, and the offset of the data block. Herein, the block generated by merging the compressed block, the node identifier, and the offset may be referred to as a merged block. A node block may refer a plurality of data blocks corresponding to a file data. A node block may identify each of the plurality of data blocks based on offset. The offset included in the merged block may be information for identifying the data block among the plurality of data blocks. In some embodiments of the inventive concept, the merged block may include a bit indicating the merged block. The compression manager 120 may also be referred to as a compression circuit or a compression manager circuit.

The file system 110 may asynchronously write the merged block and the node block corresponding to the merged block to the storage system 200. That is, a time period in which the merged block is transmitted to the storage system 200 and a time period in which the node block is transmitted to the storage system 200 may be discontinuous. For example, the merged block may be transmitted to the storage system 200 at a different time than the time at which the node block is transmitted to the storage system 200. For example, the file system 110 may write the merged block to the storage system 200 in response to a request of the user application and write the node block to the storage system 200 in a time period where an interface between the host 100 and the storage system 200 is in an idle state. Thus, a time period in which the interface between the host 100 and the storage system 200 is occupied by the node block and a time period in which the interface is occupied by the merged block may be distributed, thus increasing write performance.

The host 100 may include a memory 130. The file system 110 may divide the file data provided from the user application into data blocks and load the data blocks to the memory 130. The file system 110 may generate a node block corresponding to each data block and load the generated node block to the memory 130. The memory 130 may be a volatile memory device. For example, the memory 130 may include volatile memory such as DRAM, SDRAM, DDR SDRAM, LPDDR SDRAM, GRAM, etc.

When sudden power-off (SPO) occurs in which power supply to the host 100 is suddenly cut off, data loaded to the memory 130 may be destroyed/erased. To protect against SPO, the file system 110 may perform a checkpointing operation of storing the entire data (e.g., an NAT, a data block, and a node block) loaded to the memory 130 in the storage system 200. The storage device 220 may continuously store data even when power supply is cut off. The checkpointing operation may be periodically or aperiodically performed. For example, the checkpointing operation may be performed every 30 seconds. However, the interval at which the checkpointing operation is performed is not limited thereto.

When power is supplied again to the host 100 after SPO, the file system 110 may perform a sudden power-off recovery (SPOR) operation. In SPOR, the file system 110 may load the merged block to the memory 130 and obtain a data block from the merged block. The file system 110 may obtain a node identifier and an offset from the merged block and generate a node block corresponding to the data block.

The file system 110 according to an embodiment of the inventive concept may asynchronously write the merged block and the node block to the storage device 220. Thus, when SPO occurs after the merged block is written to the storage device 220, the node block corresponding to the merged block may be destroyed/erased in the memory 130 without being written to the storage device 220. Thus, the file system 110 may read the merged block written to the storage device 220 and generate the node block corresponding to the merged block by using the node identifier and the offset that are included in the merged block.

Figure 2:
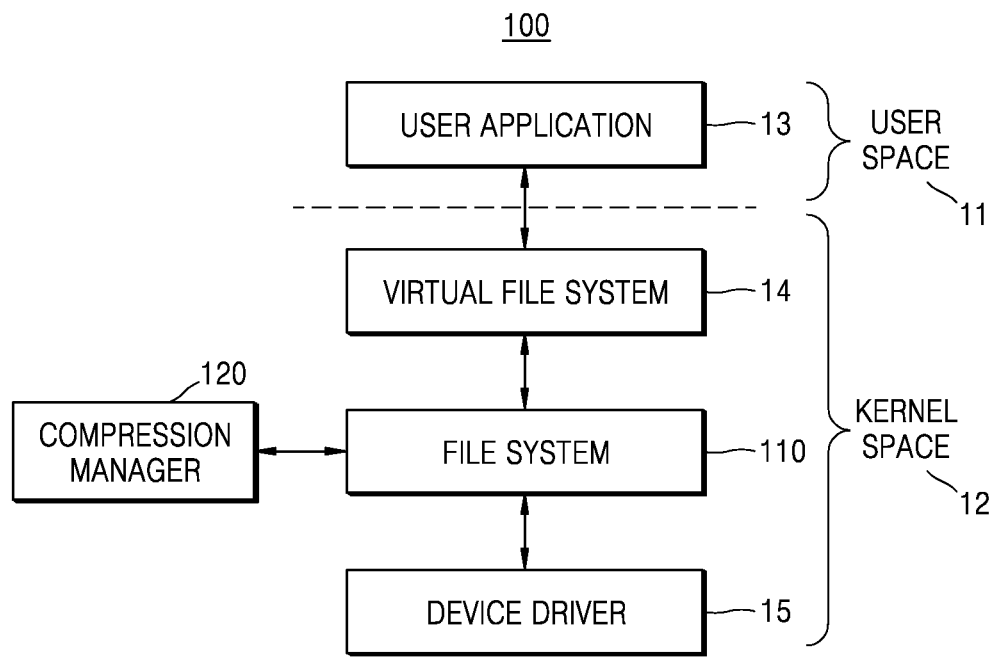
FIG. 2 is a block diagram of a host of FIG. 1 according to an embodiment of the inventive concept.

FIG. 2 is a block diagram of the host 100 of FIG. 1 according to an embodiment of the inventive concept.

Referring to FIG. 2, the host 100 may include a user space 11 and a kernel space 12.

Components shown in FIG. 2 may be software components, or hardware components such as, for example, a field-programmable gate array (FPGA) or an application-specific integrated circuit (ASIC). However, the components are not limited thereto. For example, in some embodiments, the components may be configured to exist in an addressable storage medium or may be configured to execute one or more processors. Functions provided in the components may be implemented by a further detailed component, or may be implemented as one component that performs a specific function by combining a plurality of components.

In an embodiment, the user space 11 is a region where a user application 13 is executed, and the kernel space 12 is a region that is restrictively reserved for kernel execution. For the user space 11 to access the kernel space 12, a system call may be used.

The kernel space 12 may include a virtual file system 14, the file system 110, a device driver 15, etc. According to embodiments, there may be one or more file systems 110. In some embodiments, the file system 110 may be an F2FS.

In some embodiments, the file system 110 may divide a storage region of the storage device 220 into a plurality of blocks, a plurality of sections, and a plurality of zones, and write a log provided from the user application 13 to each block. Division of the storage region of the storage device 220 into a plurality of blocks, a plurality of sections, and a plurality of zones will be described in detail with reference to FIG. 5.

The virtual file system 14 may allow one or more file systems 110 to operate with one another. The virtual file system 14 may enable use of a standardized system call to perform a read/write operation with respect to different file systems 110 of different media. Thus, for example, a system call such as open( ), read( ), and write( ) may be used regardless of a type of the file system 110. That is, the virtual file system 14 may be an abstraction layer existing between the user space 11 and the file system 110.

The device driver 15 may manage an interface between hardware and the user application 13 (or an operating system). The device driver 15 may be a program utilized for hardware to operate normally under a specific operating system.

Figure 3:
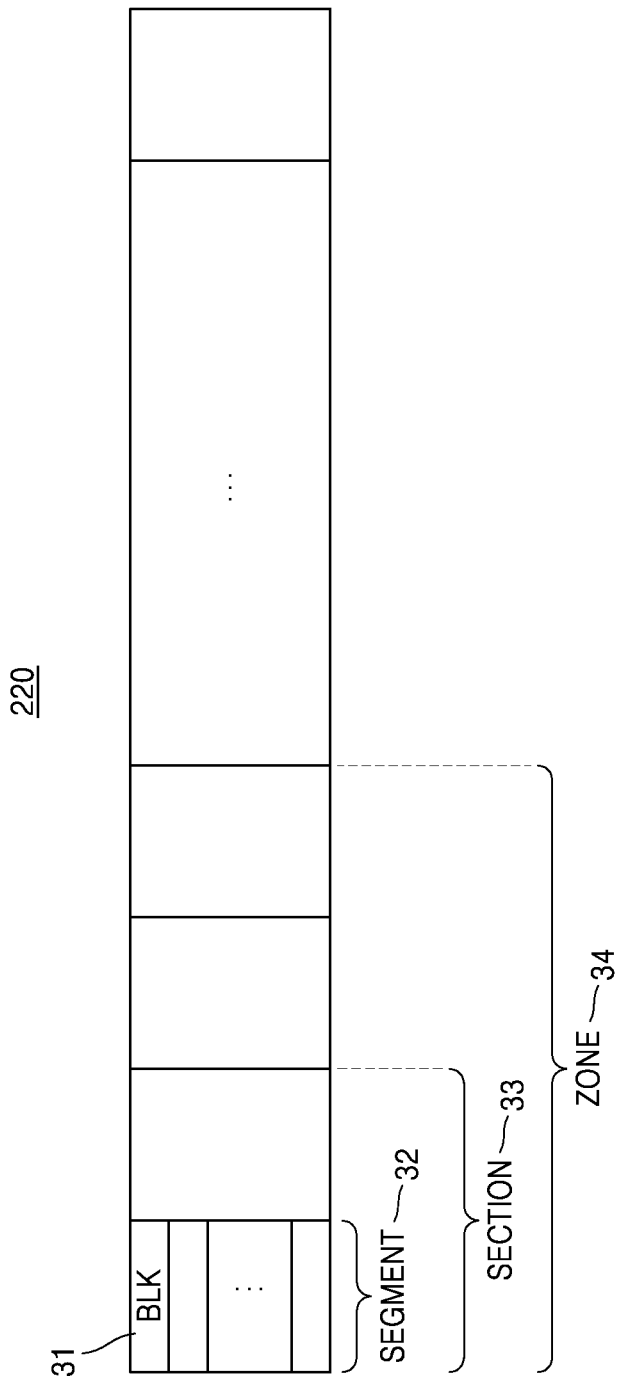
FIG. 3 is a block diagram of a storage device of FIG. 1 according to an embodiment of the inventive concept.

FIG. 3 is a block diagram of the storage device 220 of FIG. 1 according to an embodiment of the inventive concept.

Referring to FIG. 3, a storage region of the storage device 220 may be configured to include a block 31, a segment 32, a section 33, and a zone 34. The storage region of the storage device 220 may include a plurality of zones 34. The zone 34 may include a plurality of sections 33, the section 33 may include a plurality of segments 32, and the segment 32 may include a plurality of blocks 31. For example, the block 31 may be a storage region that stores 4 KB data, and the segment 32 may be a storage region that stores 2 MB data by including 512 blocks 31. A configuration of the storage device 220 as shown in FIG. 3 may be determined at, but is not limited to, the time of formatting the storage device 220. The file system 110 may read and write data in the unit of a 4 KB page. That is, the block 31 may store one page.

Figure 4:
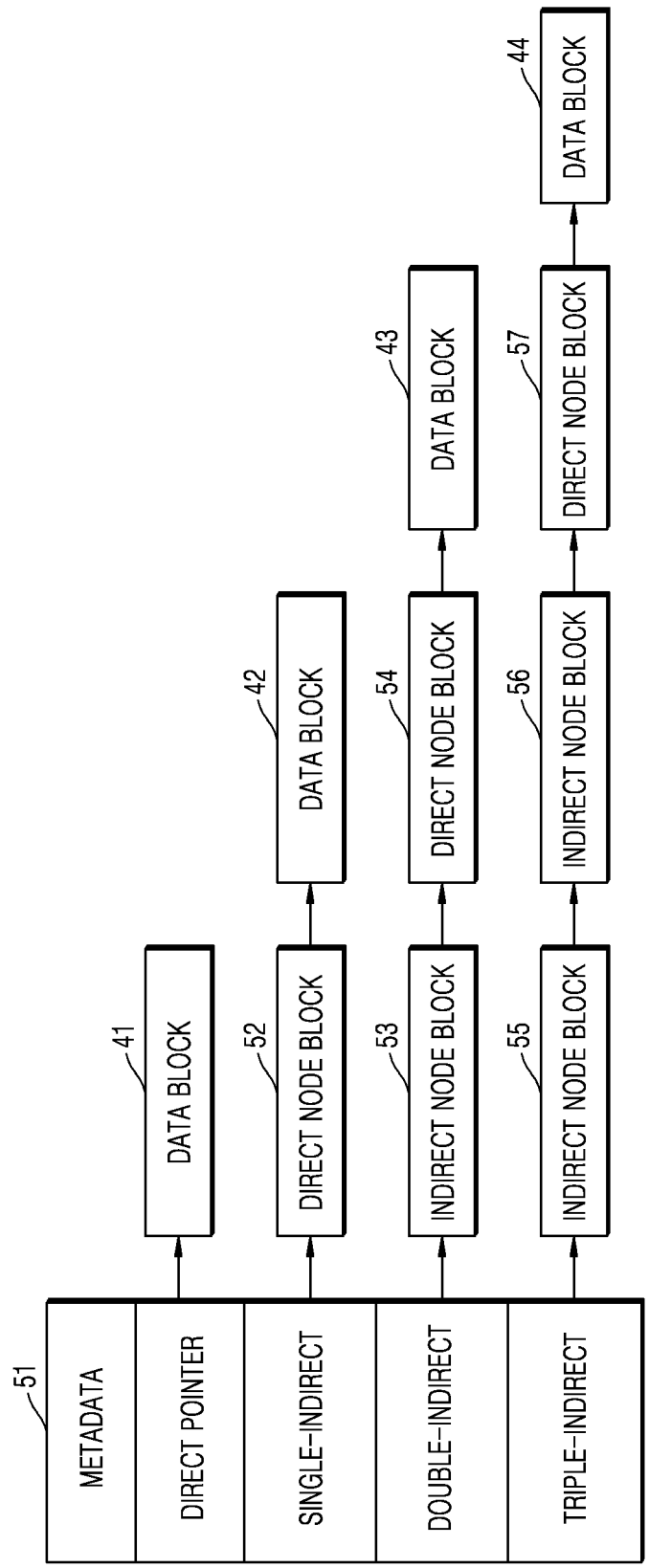
FIG. 4 is a view of a structure of a file stored in a storage device of FIG. 1 according to an embodiment of the inventive concept.

FIG. 4 is a view of a structure of a file stored in the storage device 220 of FIG. 1 according to an embodiment of the inventive concept.

The file stored in the storage device 220 may have an indexing structure. One file may include file data including content of a file to be stored by the user application 13 (of FIG. 2) and node data including an attribute of the file, a location of a data block in which the file data is to be stored, etc.

Referring to FIG. 4, data blocks 41 to 44 may be storage regions that store the file data, and node blocks 51 to 57 may be storage regions that store the node data.

The node blocks 51 to 57 may include an inode block 51, direct node blocks 52, 54, and 57, and indirect node blocks 53, 55, and 56.

The inode block 51 may include at least one of a direct pointer directly pointing to the data block 41, a single-indirect node pointer pointing to the direct node block 52, a double-indirect node pointer pointing to the indirect node block 53, or a triple-indirect node pointer pointing to the indirect node block 55. An inode block may be provided for each file. Although each of the node blocks 51 to 57 is illustrated as indicating on data block, the embodiment is not limited thereto. Each of the node blocks 51 to 57 may indicate plurality of data blocks. In some embodiments, each of the plurality of data blocks may be identified based on an offset. The offset may be an index of each of the plurality of data blocks.

The indirect node blocks 52, 54, and 57 may include data pointers directly pointing to the data blocks 41, 43, and 44.

The indirect node blocks 53, 55, and 56 may include first indirect node blocks 53 and 56 and a second indirect node block 55. The first indirect node blocks 53 and 56 may include a first node pointer pointing to the direct node blocks 54 and 57. The second indirect node block 55 may include a second node pointer pointing to the first indirect node block 56.

Figure 5:
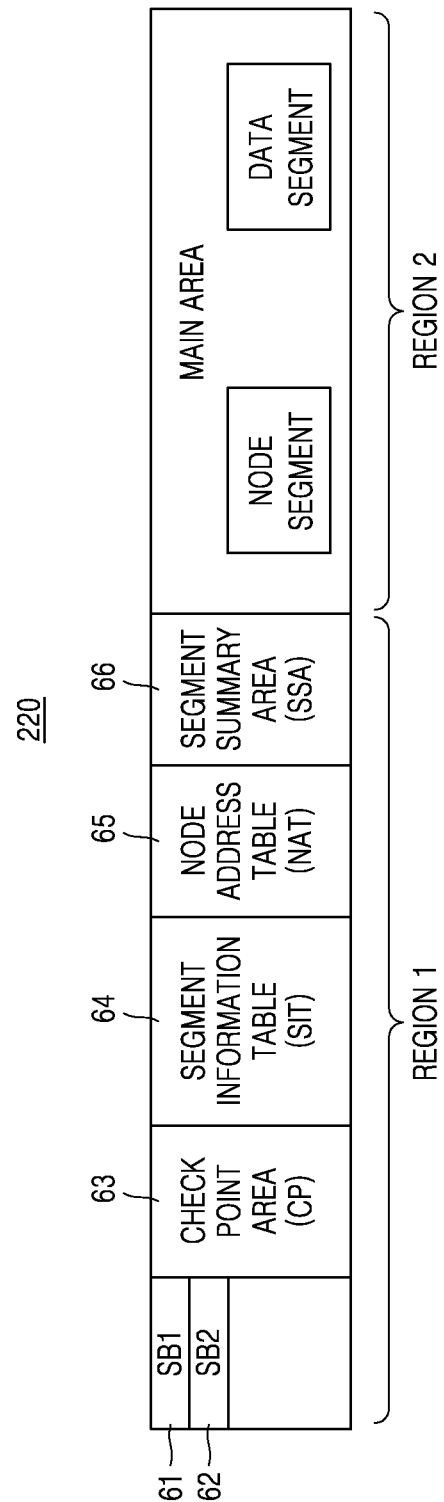
FIG. 5 is a block diagram of a storage device of FIG. 1 according to an embodiment of the inventive concept.
Figures 6, 7:
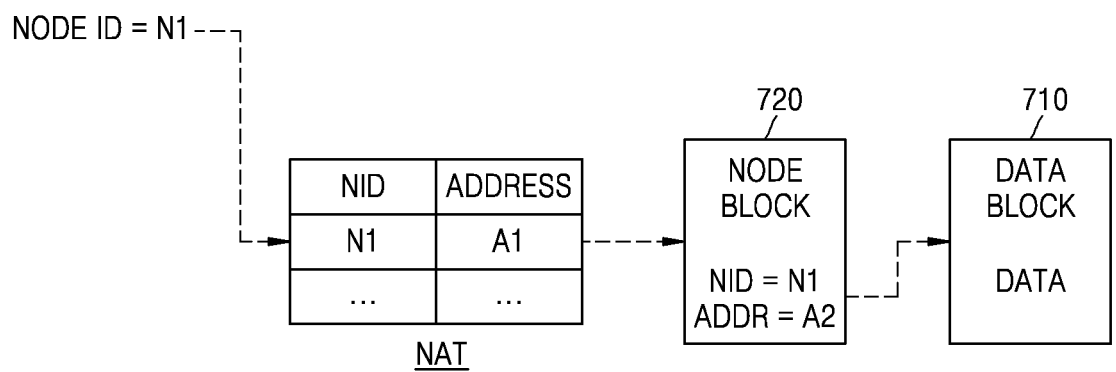
FIG. 6 is a diagram of a node address table according to an embodiment of the inventive concept.
FIG. 7 is a diagram of a method of accessing a data block, according to an embodiment of the inventive concept.

FIG. 5 is a block diagram of the storage device of FIG. 1 according to an embodiment of the inventive concept. FIG. 6 is a diagram of an NAT according to an embodiment of the inventive concept.

Referring to FIG. 5, a storage region of the storage device 220 may include a first region REGION 1 and a second region REGION 2. In the file system 110, the storage region of the storage device 220 may be divided into the first region REGION 1 and the second region REGION 2 in formatting, but embodiments of the inventive concept are not limited thereto.

In an embodiment, the first region REGION 1 is a region where various pieces of information managed by the entire system are stored, and may include, for example, the number of files allocated currently, the number of valid pages, a location, etc. In an embodiment, the second region REGION 2 is a storage region that stores various pieces of directory information, data, file information actually used by a user, etc.

The first region REGION 1 may include a first super block SB1 61 and a second super block SB2 62, a checkpoint area (CP) 63, a segment information table (SIT) 64, an NAT 65, a segment summary area (SSA) 66, etc.

The first super block SB1 61 and the second super block SB2 62 may store default information of the file system 110. For example, a size of the first super block SB1 61, the number of blocks 61, a state plug (clean, stable, active, logging, unknown) of the file system 110, etc., may be stored. As shown, the first super block 61 and the second super block 62 may be a total of two blocks, each of which stores the same content. Thus, even when a problem occurs in any one of the two super blocks, the other super block may be used.

The CP 63 may store a checkpoint. The checkpoint may be a logical breakpoint, and a state to the breakpoint may be fully preserved. When SPO occurs during an operation of the computing system 10, the file system 110 may recover data by using the preserved checkpoint. The checkpoint may be periodically generated. However, generation of the checkpoint is not limited thereto.

The NAT 65 may include a plurality of node identifiers NODE IDs (NIDs) respectively corresponding to node blocks and a plurality of addresses respectively corresponding to the plurality of node identifiers, as shown in FIG. 6. For example, a node block corresponding to a node identifier N1 may correspond to an address A1, a node block corresponding to a node identifier N2 may correspond to an address A2, and a node block corresponding to a node identifier N3 may correspond to an address A3.

All nodes (an inode, a direct node, an indirect node, etc.) may have their unique node identifiers. The NAT 65 may store a node identifier of an inode, a node identifier of a direct node, a node identifier of an indirect node, etc. The file system 110 may update an address corresponding to each node identifier.

The SIT 64 may include the number of valid pages of each segment and a bitmap of a plurality of pages. In the bitmap, whether each page is valid may be indicated by 0 or 1. The SIT 64 may be used in a cleaning task (or garbage collection). For example, the bitmap may reduce an unnecessary read request when the cleaning task is performed, and the bitmap may be used when block allocation is performed in adaptive data logging.

In an embodiment, the SSA 66 is an area where summary information of each segment of the second region REGION 2 is gathered. For example, the SSA 66 may describe information of a node including a plurality of blocks of each segment of the second region REGION 2. The SIT 66 may be used in the cleaning task (or garbage collection). For example, an upper-node block may have a node identifier list or address to identify a location of the data blocks 41 to 44 or a lower node block. In an embodiment, the upper node block is a node block that refers to a lower node block through a node pointer, and the lower node block is a node block referred to by the upper node block through the node pointer. The SSA 66 may provide an index that allows the data blocks 41 to 44 or the lower node block to identify a location of the upper node block. The SSA 66 may include a plurality of segment summary blocks. One segment summary block may have information about one segment located in the second region REGION 2. The segment summary block may include a plurality of pieces of summary information, and one piece of summary information may correspond to one data block or one node block.

FIG. 7 is a diagram of a method of accessing a data block, according to an embodiment of the inventive concept. FIG. 7 will be described below with reference to FIG. 1.

Referring to FIG. 7, a data block 710 may include at least a part of file data. The data block 710 may be stored in an address A2. A node block 720 may store an address A2 indicating a storage location of the data block 710, and may be stored in the address A1. The file system 110 may allocate the node identifier N1 to the node block 720.

The file system 110 may refer to an NAT to access a data block corresponding to the node identifier N1. The file system 110 may obtain the address A1 from the NAT. The file system 110 may access the node block 720 by using the address A1. The file system 110 may obtain the address A2 from the node block 720. The file system 110 may access the data block 710 by using the address A2.

In FIG. 7, the node block 720 may correspond to the direct node blocks 52, 54, and 57 of FIG. 4. However, embodiments of the inventive concept are not limited thereto. For example, in some embodiments, the file system 110 may access the data block 710 by using the indirect node blocks 53, 55, and 56 or the inode block 51.

Figure 8:
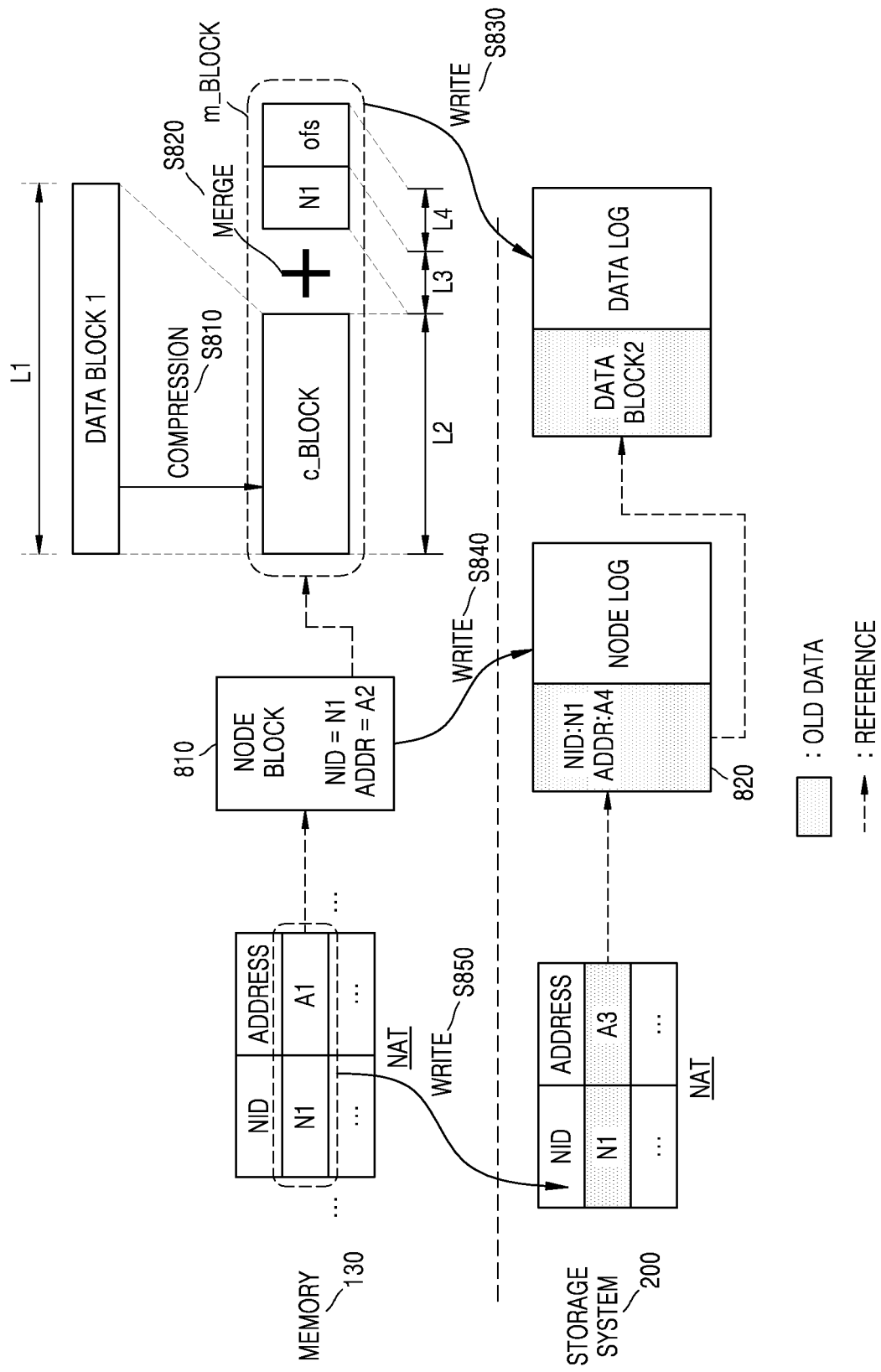
FIG. 8 is a diagram of a write operation according to an embodiment of the inventive concept.

FIG. 8 is a diagram of a write operation according to an embodiment of the inventive concept. FIG. 8 will be described below with reference to FIGS. 1 and 2.

The file system 110 may provide data utilized by a user application using data loaded onto the memory 130 and update the data loaded onto the memory 130 based on file data provided by the user application. The memory 130 is volatile memory, such that the file system 110 may write data on the memory 130 to the storage system 200 including non-volatile memory to protect the data. The host 100 may write the data loaded onto the memory 130 to the storage system 200 through a plurality of operations S810 through S850.

In operation S810, the compression manager 120 included in the host 100 may generate a compressed block c_BLOCK by compressing a first data block DATA BLOCK 1. A size of the first data block DATA BLOCK 1 may be L1. In some embodiments of the inventive concept, L1 may be 4 KB. A size of the compressed block c_BLOCK may be L2, which is smaller than L1. The compression manager 120 may compress the first data block DATA BLOCK 1 by using a compression algorithm such as, for example, a run-length encoding scheme, a Huffman coding scheme, an arithmetic coding scheme, an entropy coding scheme, a Markov chain scheme, a range coding scheme, or a differential pulse-code-modulation scheme.

In operation S820, the file system 110 may generate a merged block m_BLOCK by merging the compressed block c_BLOCK, the node identifier N1, and an offset ofs of the first data block DATA BLOCK 1. A size of the merged block m_BLOCK may be L1. In some embodiments of the inventive concept, L1 may be 4 KB. That is, a sum of the size L2 of the compressed block c_BLOCK, the size L3 of the node identifier N1, and the size L4 of the offset ofs may be L1. The file system 110 may generate a node block 810 corresponding to the first data block DATA BLOCK 1. The node block 810 may be a block including the node identifier N1 and the address A2. The address A2 may indicate a location where the merged block m_BLOCK is stored. The node block 810 may refer a plurality of data blocks including the first data block DATA BLOCK 1. The node block 810 may identify the first data block DATA BLOCK 1 based on the offset ofs among the plurality of data blocks.

In operation S830, the file system 110 may write the merged block m_BLOCK to the storage system 200. The merged block m_BLOCK may be written to a data log included in the storage device 220. In the data log, a data block may be sequentially written. Thus, the merged block m_BLOCK may be sequentially written from a location next to a location where a second data block DATA BLOCK 2, which is an existing data block, is stored. The first data block DATA BLOCK 1 and the second data block DATA BLOCK 2 may be data regarding the same file, in which the first data block DATA BLOCK 1 may be the latest data block and the second data block DATA BLOCK 2 may be an existing data block. In an embodiment, the data log means a storage region corresponding to a data segment of FIG. 5. The first data block DATA BLOCK 1 may be a merged block.

In operation S840, the file system 110 may write a node block 810 corresponding to the merged block m_BLOCK to the storage system 200. The node block 810 may be written to a node log included in the storage device 220. In the node log, a node block may be sequentially written. Thus, the node block 810 may be sequentially written from a location next to a location where a second node block 820, which is an existing node block, is stored. The second node block 820 may store an address A4 of the second data block DATA BLOCK 2 that is an existing data block. Operation S840 may be performed during an idle time when an interface between the host 100 and the storage system 200 is not occupied by data. That is, a time period in which the merged block m_BLOCK is written. A time period in which the node block 810 is written may be discontinuous. For example, a time in which the interface between the host 100 and the storage system 200 is occupied by the merged block m_BLOCK and a time in which the interface is occupied by the node block may be distributed, thus increasing write performance.

In operation S850, the file system 110 may perform an update operation on an NAT by performing a write operation of changing an address for the node identifier N1 into A1. Before the update operation is performed, the address A3 may correspond to the node identifier N1 on the NAT of the storage system 200. After the update operation is performed, the address A1 may correspond to the node identifier N1.

After operation S850, even when SPO occurs, the file system 110 may read the address A1 corresponding to the node identifier N1 by referring to an NAT stored in the storage system 200, access the node block 810 by using the address A1, and access the merged block m_BLOCK by using the address A2 stored in the node block 810.

The file system 110 according to an embodiment of the inventive concept may access the merged block m_BLOCK, update the node block 810 indicating the merged block m_BLOCK, and update the NAT to indicate the node block 810, even when SPO occurs after operation S830.

Figure 9:
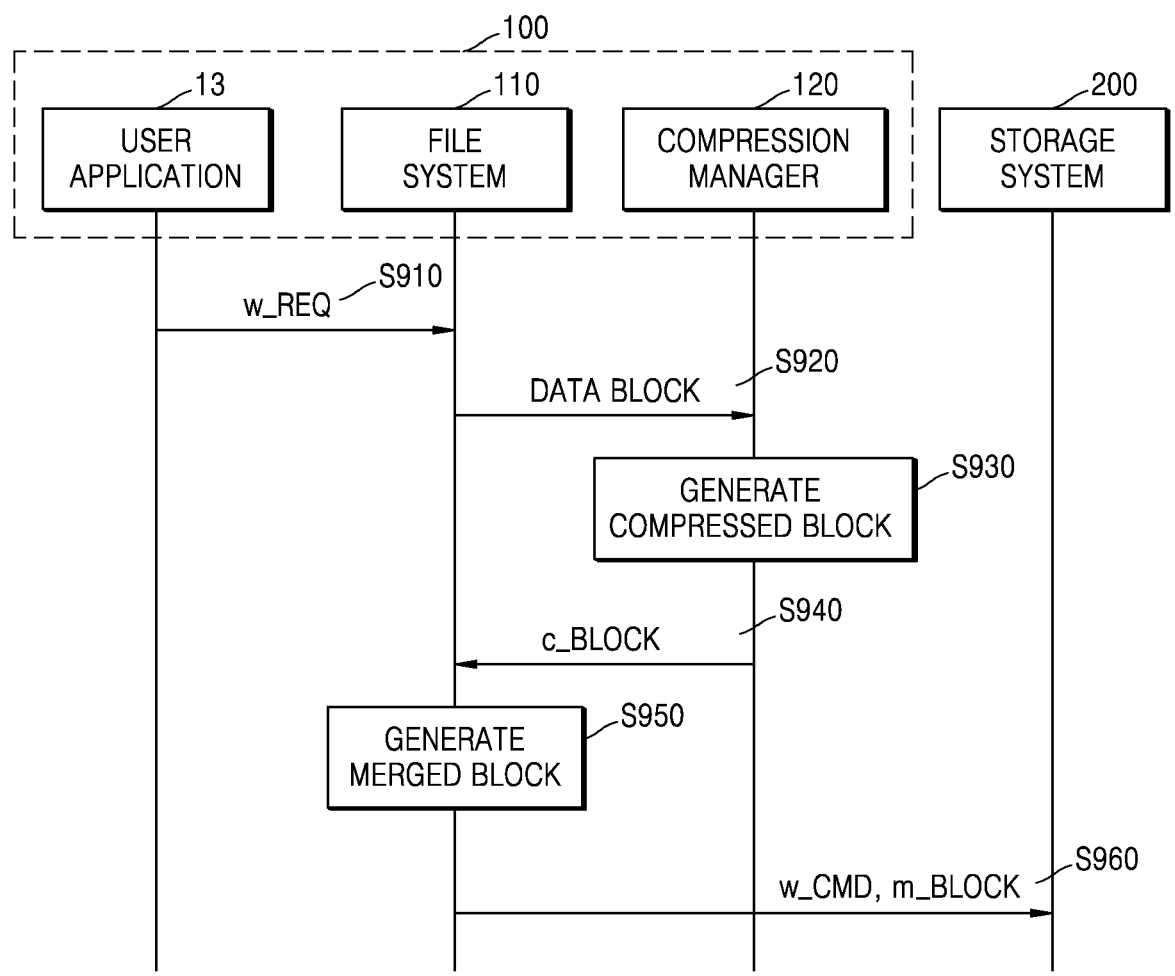
FIG. 9 is a diagram of an operating method of a computing system according to an embodiment of the inventive concept.

FIG. 9 is a diagram of an operating method of a computing system according to an embodiment of the inventive concept.

Referring to FIG. 9, an operating method of a computing system may include a plurality of operations S910 to S960.

In operation S910, a user application may transmit a write request w_REQ to the file system 110. The write request w_REQ may be a type of a system call. For example, the write request w_REQ may be write( ).

In operation S920, the file system 110 may generate a data block corresponding to the write request and transmit the data block to the compression manager 120. The file system 110 may generate at least one node block corresponding to the data block. At least one node block may include at least one of an inode block, a direct block, or an indirect block. The data block and the node block may have a preset size L1 (e.g., 4 KB).

In operation S930, the compression manager 120 may generate the compressed block c_BLOCK. For example, the compression manager 120 may stop a compression operation according to whether the size of the data block is reduced by a reference size. The reference size may be determined based on a sum of a size of a node identifier and a size of an offset of the data block. In some embodiments of the inventive concept, the reference size may be determined based on the size of the node identifier, the size of the offset, and a size of a compression mark. In an embodiment, the compression mark means at least one bit indicating that the data block is compressed. In operation S930, when the size of the data block is not reduced by the reference size, the compression manager 120 may provide a compression failure signal to the file system 110.

In operation S940, the compression manager 120 may provide the compressed block c_BLOCK to the file system 110. The size of the compressed block c_BLOCK may be L2, which is smaller than L1.

In operation S950, the file system 110 may generate the merged block m_BLOCK. For example, the file system 110 may generate the merged block m_BLOCK by merging the compressed block c_BLOCK, an offset of the data block, and a node identifier. The size of the merged block m_BLOCK may be equal to a size of a data block. For example, the size of the merged block m_BLOCK may be 4 KB.

In operation S960, the file system 110 may transmit a write command w_CMD and the merged block m_BLOCK to the storage system 200. When an idle time of the storage system 200 occurs after the file system 110 transmits the merged block m_BLOCK to the storage system 200, the node block may be transmitted to the storage system 200. That is, the storage system 200 may asynchronously write the merged block m_BLOCK and the node block. In operation S930, when the compressed block c_BLOCK is not generated, the file system 110 may transmit the write command w_CMD, the data block, and the node block to the storage system 200. That is, the storage system 200 may synchronously write the data block and the node block.

Figure 10:
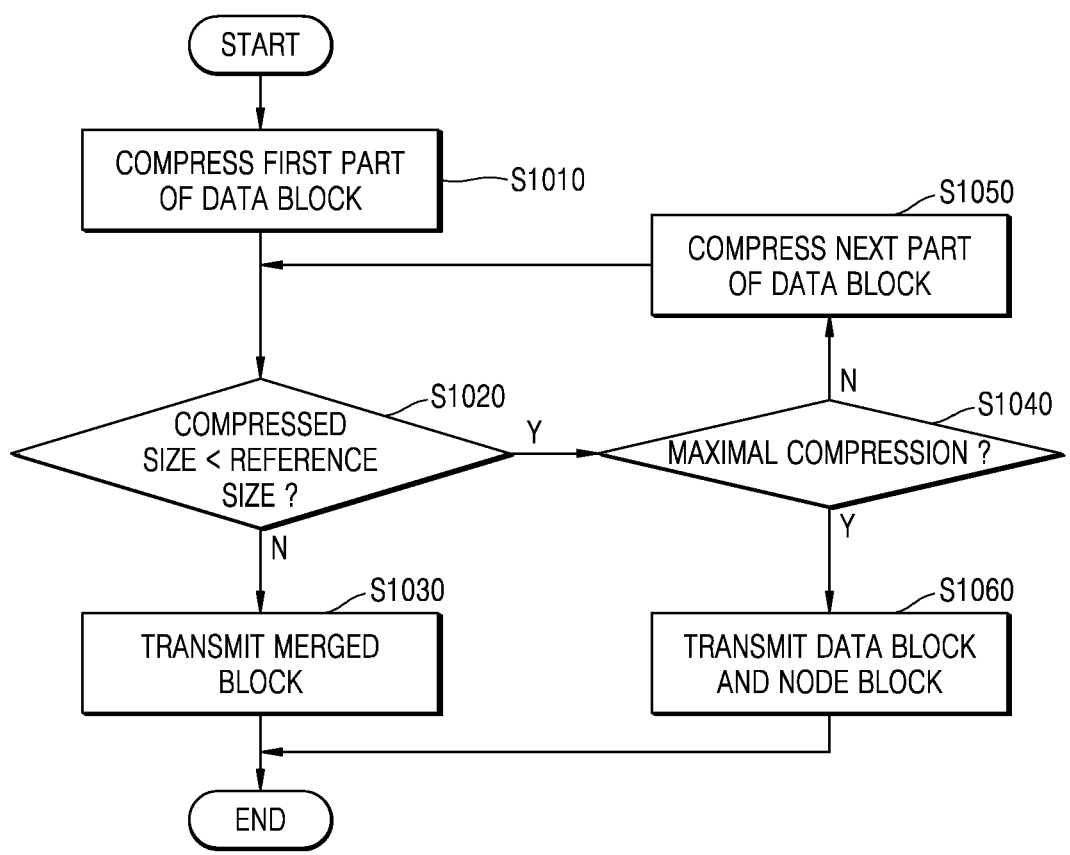
FIG. 10 is a flowchart of an operating method of a host according to an embodiment of the inventive concept.

FIG. 10 is a flowchart of an operating method of a host according to an embodiment of the inventive concept.

Referring to FIG. 10, an operating method of a host may include a plurality of operations S1010 to S1060.

In operation S1010, the compression manager 120 may perform a compression operation on a first part of a data block. The first part may be a part having a preset size of the data block. A compression size may differ with a data state of a part having a preset size and a compression algorithm.

In operation S1020, the compression manager 120 may compare a compressed size with the reference size. In some embodiments of the inventive concept, the compression manager 120 may compare a size reduced by compression for the first part with the reference size. The reference size may correspond to a sum of the size of the node identifier and the size of an offset of the data block. In some embodiments of the inventive concept, the reference size may correspond to the size of the node identifier, the size of the offset, and the size of the merge mark. When the compressed size is less than the reference size, operation S1040 may be performed, and when the compressed size is equal to or greater than the reference size, operation S1030 may be performed.

In operation S1030, the file system 110 may generate a merged block and transmit the merged block to the storage system 200. The file system 110 may transmit the merged block and a write command, together, to the storage system 200 to perform a write operation on the merged block. The file system 110 may provide, to the storage system 200, a node block corresponding to the merged block in a time period that is different from a time period in which the merged block is transmitted, thereby increasing write performance.

In operation S1040, the compression manager 120 may determine whether maximal compression is performed on the data block. When maximal compression is performed, operation S1060 may be performed, and when maximal compression is not performed, operation S1050 may be performed.

In operation S1050, the compression manager 120 may compress a next part of the data block. The next part of the data block may have a size that is equal to or different from the size of the first part. After the next part is compressed, operation S1020 may be performed again. As the compression manager 120 compresses the data block in a stepwise manner, a compression time utilized for generating the merged block may be reduced.

In operation S1060, the file system 110 may transmit the data block and the node block to the storage system 200 such that the data block and the node block are written to the storage system 200 in a continuous time period.

Figure 11:
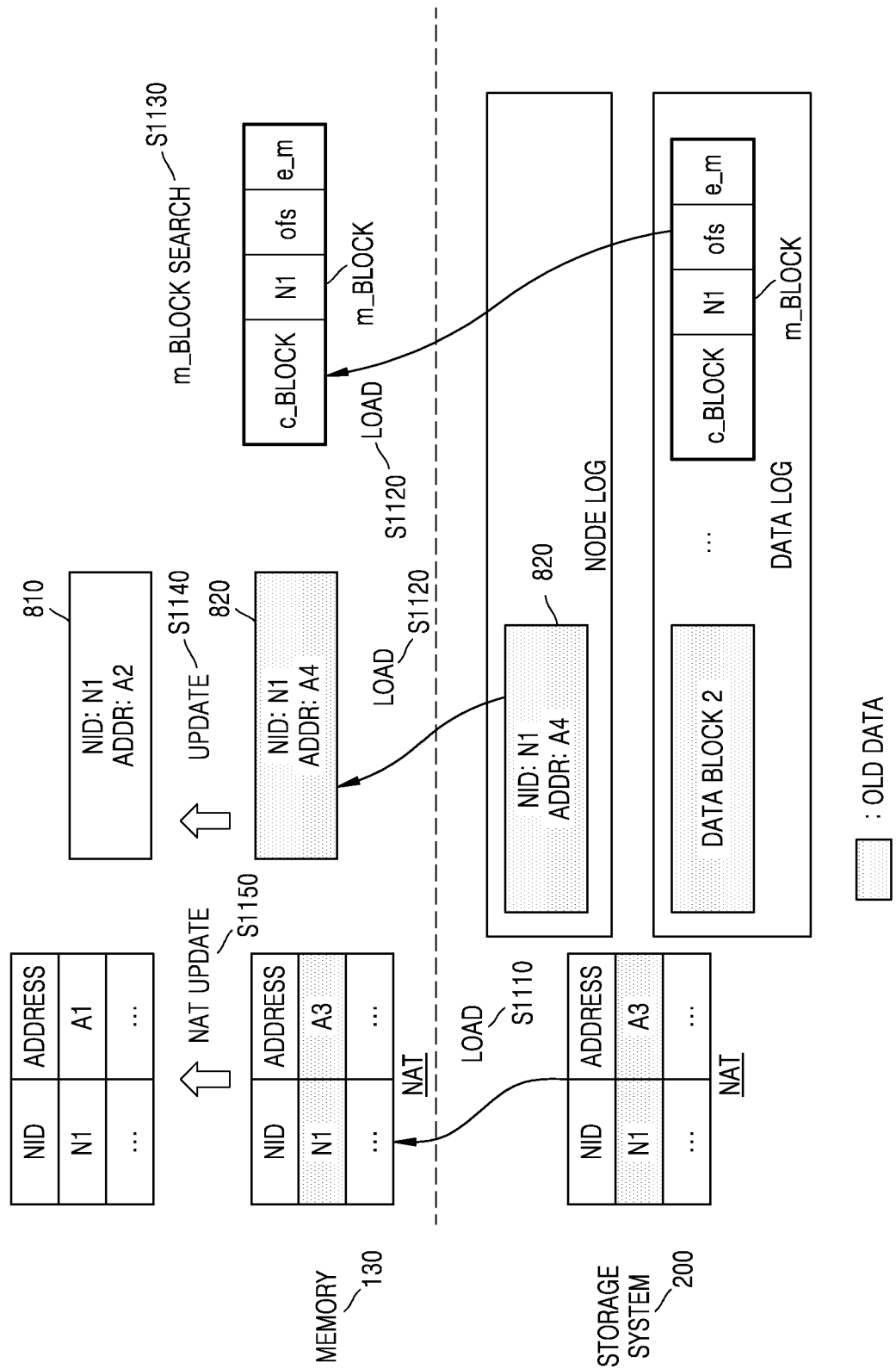
FIG. 11 is a diagram of a sudden power-off recovery operation according to an embodiment of the inventive concept.

FIG. 11 is a diagram of a SPOR operation according to an embodiment of the inventive concept.

Referring to FIG. 8, after operation S830, SPO may occur. Thus, when the node block 810 is not written to the node log, data in the memory 130 may be destroyed/erased. That is, as shown in FIG. 11, when the merged block m_BLOCK is written to the data log and the first node block 810 corresponding to the merged block m_BLOCK is not written, SPO may occur. Thus, the existing second node block 820 written to the node log may indicate the address A4 of the second data block DATA BLOCK 2 that is the existing data block, instead of the address A2 of the merged block m_BLOCK. The SPOR operation may include a plurality of operations S1110 to S1150.

In operation S1110, the file system 110 may load the NAT to the memory 130. While it is illustrated in FIG. 11 that existing data is written to the NAT, embodiments of the inventive concept are not limited thereto. For example, in some embodiments, the NAT loaded to the memory 130 may store the address A3 corresponding to the node identifier N1 and store the address A2 corresponding to the node identifier N1.

In operation S1120, the file system 110 may load the merged block m_BLOCK written to the data log to the memory 130. As blocks are sequentially written to the data log, the file system 110 may sequentially load the blocks to the memory 130 from the latest written blocks. It is illustrated in FIG. 11 that the merged block m_BLOCK is loaded, but the data block instead of the merged block may be loaded to the memory 130. The file system 110 may load the second node block 820 written to the node log to the memory 130.

In operation S1130, the file system 110 may search for the merged block m_BLOCK among loaded blocks. The file system 110 may search for the merged block m_BLOCK by identifying a merge mark e_m among the loaded blocks.

In operation S1140, the file system 110 may generate the first node block 810 by updating the second node block 820 such that the second node block 820 corresponds to the merged block m_BLOCK. For example, the file system 110 may update the second node block 820 based on the node identifier N1 and an offset ofs of the data block included in the merged block m_BLOCK. As a plurality of data blocks are sequentially written to the data log and sizes of the plurality of data blocks, the file system 110 may obtain an address of the merged block m_BLOCK. Further, the file system 110 may connect the first node block 810 to first data block DATA BLOCK 1 based on the offset ofs. Specifically, the file system 110 may set a data block corresponding to the offset ofs among a plurality of data blocks referred to the first node block 810 to the first data block DATA BLOCK 1. Accordingly, as the second node block 820 may be updated to the first node block 810 based on the node identifier N1 and the offset ofs, the first node block 810 may be recovered even when operation S840 of FIG. 8 is not performed.

In operation S1150, the file system 110 may update the NAT. For example, the file system 110 may update the address corresponding to the node identifier N1 from A3 to A1.

Figure 12:
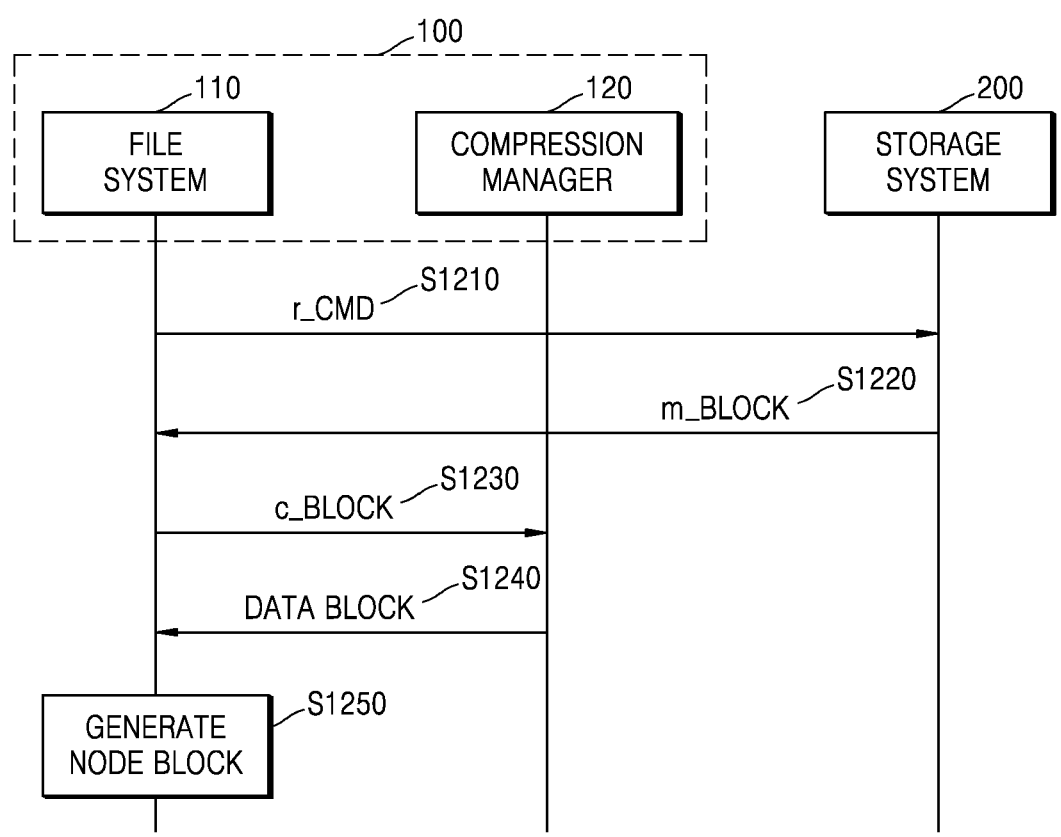
FIG. 12 is a diagram of an operating method of a computing system that performs a recovery operation according to an embodiment of the inventive concept.

FIG. 12 is a diagram of an operating method of a computing system that performs a recovery operation according to an embodiment of the inventive concept.

Referring to FIG. 12, an operating method of a computing system may include a plurality of operations S1210 to S1240.

In operation S1210, the file system 110 may transmit a read command r_CMD to the storage system 200. The file system 110 may transmit an address of a block recently written to the data log, together with the read command r_CMD, to the storage system 200. The address of the recently written block may be obtained through a CP. The recently written block may be the most recently written bock (e.g., the latest written block).

In operation S1220, the storage system 200 may transmit the merged block m_BLOCK to the file system 110. The storage system 200 may transmit the data block and the node block as well as the merged block m_BLOCK.

In operation S1230, the file system 110 may search for the merged block m_BLOCK among blocks received from the storage system 200 and transmit the compressed block c_BLOCK included in the found merged block m_BLOCK to the compression manager 120.

In operation S1240, the compression manager 120 may generate a data block by performing decompression on the compressed block c_BLOCK, and transmit the data block to the file system 110. The data block may be stored in the memory 130.

In operation S1250, the file system 110 may generate a node block corresponding to the data block based on the node identifier and the address included in the merged block m_BLOCK. The node block may be stored in the memory 130.

Figure 13:
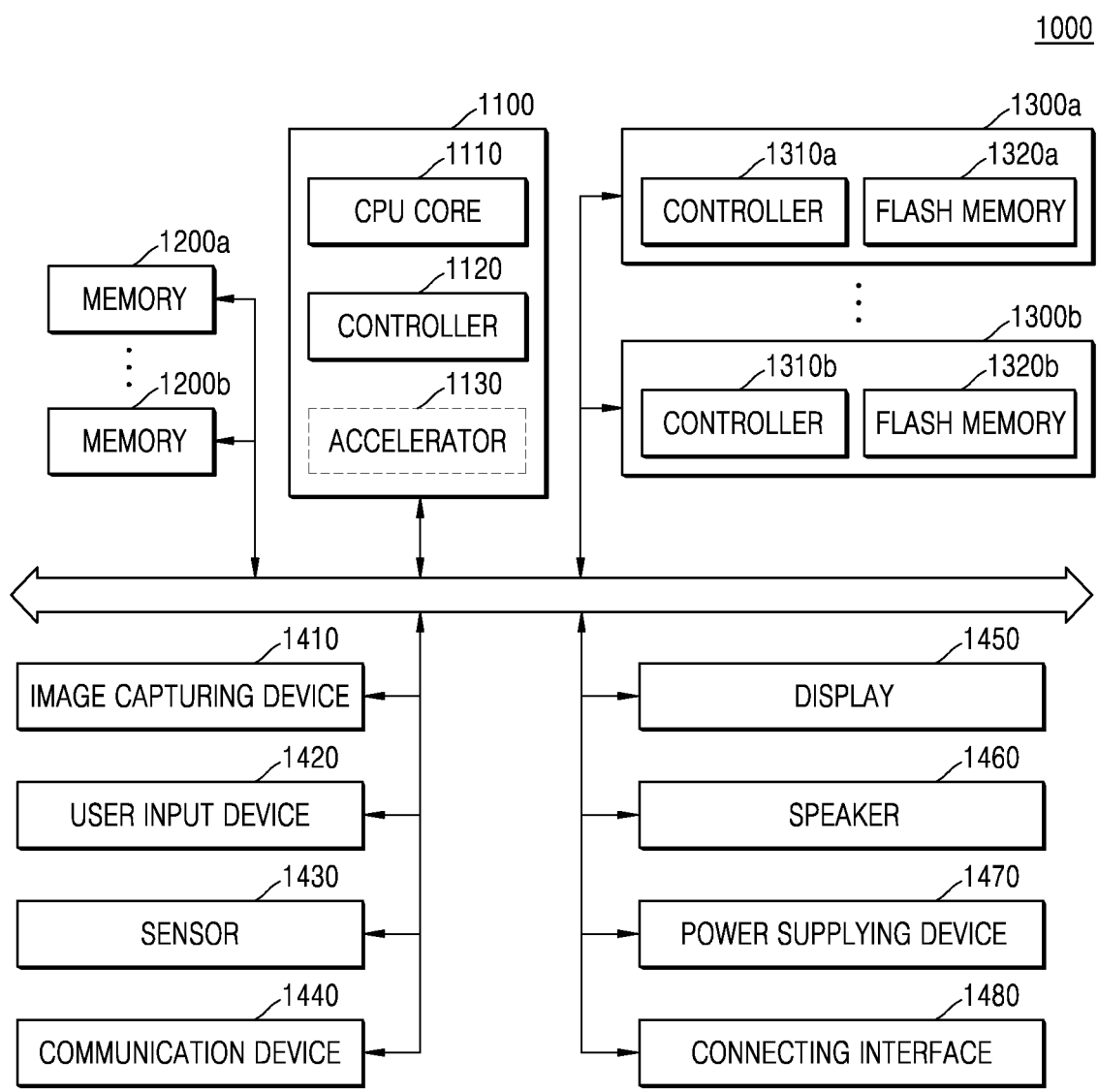
FIG. 13 illustrates a computing system according to an embodiment of the inventive concept.

FIG. 13 is a diagram of a computing system 1000 to which a storage device is applied according to an embodiment of the inventive concept. The system 1000 of FIG. 13 may be, for example, a mobile system, such as a portable communication terminal (e.g., a mobile phone), a smartphone, a tablet personal computer (PC), a wearable device, a healthcare device, or an Internet of things (IOT) device. However, the system 1000 of FIG. 13 is not necessarily limited to such a mobile system, and may be, for example, a PC, a laptop computer, a server, a media player, or an automotive device (e.g., a navigation device). The system 1000 may include the computing system 10 of FIG. 1.

Referring to FIG. 13, the computing system 1000 may include a main processor 1100, memories (e.g., 1200*a* and 1200*b*), and storage systems (e.g., 1300*a* and 1300*b*). In addition, the computing system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the computing system 1000, including, for example, operations of components included in the computing system 1000. The main processor 1100 may be implemented as, for example, a general-purpose processor, a dedicated processor, or an application processor.

The main processor 1100 may include at least one CPU core 1110, and may further include a controller 1120 configured to control the memories 1200*a* and 1200*b* and/or the storage systems 1300*a* and 1300*b*. In some embodiments, the main processor 1100 may further include an accelerator 1130, which is a dedicated circuit for a high-speed data operation, such as an artificial intelligence (AI) data operation. The accelerator 1130 may include, for example, a graphics processing unit (GPU), a neural processing unit (NPU) and/or a data processing unit (DPU), and be implemented as a chip that is physically separate from the other components of the main processor 1100.

The memories 1200*a* and 1200*b* may be used as main memory devices of the computing system 1000. Although each of the memories 1200*a* and 1200*b* may include a volatile memory, such as, for example, static random access memory (SRAM) and/or dynamic RAM (DRAM), in some embodiments, each of the memories 1200*a* and 1200*b* may include a non-volatile memory, such as, for example, a flash memory, phase-change RAM (PRAM) and/or resistive RAM (RRAM). The memories 1200*a* and 1200*b* may be implemented in the same package as the main processor 1100. The host 100 of FIG. 1 may be implemented by the main processor 1100 and the memories 1200*a* and 1200*b* of FIG. 13.

The storage systems 1300*a* and 1300*b* may serve as non-volatile storage devices configured to store data regardless of whether power is supplied thereto, and have larger storage capacity than the memories 1200*a* and 1200*b*. The storage systems 1300*a* and 1300*b* may respectively include storage controllers 1310*a* and 1310*b* and NVMs 1320*a* and 1320*b* configured to store data via the control of the storage controllers 1310*a* and 1310*b*. Although the NVMs 1320*a* and 1320*b* may include flash memories having a two-dimensional (2D) structure or a three-dimensional (3D) V-NAND structure, in some embodiments, the NVMs 1320*a* and 1320*b* may include other types of NVMs, such as, for example, PRAM and/or RRAM.

The storage systems 1300*a* and 1300*b* may be physically separated from the main processor 1100 and included in the computing system 1000, or implemented in the same package as the main processor 1100. The storage systems 1300*a* and 1300*b* may be solid-state devices (SSDs) or memory cards and be removably combined with other components of the system 1000 through an interface, such as the connecting interface 1480 that will be described further below. The storage systems 1300*a* and 1300*b* may be devices to which a standard protocol, such as, for example, universal flash storage (UFS), embedded multi-media card (eMMC), or non-volatile memory express (NVMe), is applied, without being limited thereto. The storage system 200 of FIG. 1 may be included in at least one of the storage systems 1300a and 1300b.

The image capturing device 1410 may capture still images or moving images. The image capturing device 1410 may include, for example, a camera, a camcorder, and/or a webcam.

The user input device 1420 may receive various types of data input by a user of the system 1000 and include, for example, a touch pad, a keypad, a keyboard, a mouse, and/or a microphone.

The sensor 1430 may detect various types of physical quantities, which may be obtained from outside of the computing system 1000, and convert the detected physical quantities into electric signals. The sensor 1430 may include, for example, a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include, for example, an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery embedded in the computing system 1000 and/or an external power source, and supply the converted power to each of components of the computing system 1000.

The connecting interface 1480 may provide a connection between the computing system 1000 and an external device, which is connected to the computing system 1000 and capable of transmitting and receiving data to and from the computing system 1000. The connecting interface 1480 may be implemented by using various interface schemes, such as, for example, advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 14:
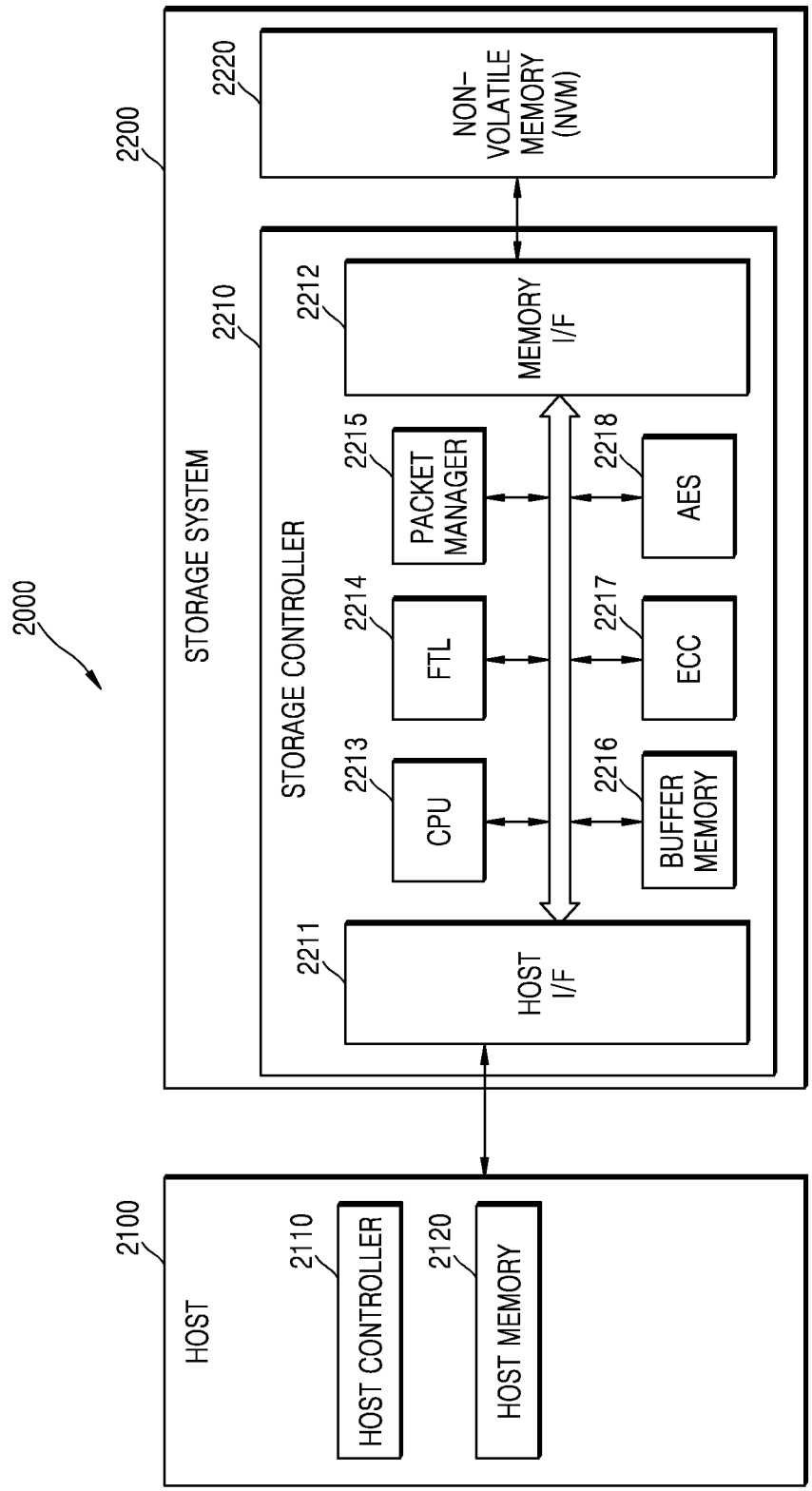
FIG. 14 is a block diagram of a computing system according to an embodiment of the inventive concept.

FIG. 14 is a block diagram of a computing system 2000 according to an embodiment of the inventive concept.

The computing system 2000 may include a host 2100 and a storage system 2200. The storage system 2200 may include a storage controller 2210 and an NVM 2220. According to an embodiment, the host 2100 may include a host controller 2110 and a host memory 2120. The host memory 2120 may serve as a buffer memory configured to temporarily store data to be transmitted to the storage system 2200 or data received from the storage system 2200. The host 2100 is an example of the host 100 of FIG. 1.

The storage system 2200 may include storage media configured to store data in response to requests from the host 2100. As an example, the storage system 2200 may include at least one of an SSD, an embedded memory, and a removable external memory. When the storage system 2200 is an SSD, the storage system 2200 may be a device that conforms to an NVMe standard. When the storage system 2200 is an embedded memory or an external memory, the storage system 2200 may be a device that conforms to a UFS standard or an eMMC standard. Each of the host 2100 and the storage system 2200 may generate a packet according to an adopted standard protocol and transmit the packet.

When the NVM 2220 of the storage system 2200 includes a flash memory, the flash memory may include a 2D NAND memory array or a 3D (or vertical) NAND (VNAND) memory array. As another example, the storage system 2200 may include various other kinds of NVMs. For example, the storage system 2200 may include magnetic RAM (MRAM), spin-transfer torque MRAM, conductive bridging RAM (CBRAM), ferroelectric RAM (FRAM), PRAM, RRAM, and various other kinds of memories.

According to an embodiment, the host controller 2110 and the host memory 2120 may be implemented as separate semiconductor chips. Alternatively, in some embodiments, the host controller 2110 and the host memory 2120 may be integrated in the same semiconductor chip. As an example, the host controller 2110 may be any one of a plurality of modules included in an application processor (AP). The AP may be implemented as a system-on-chip (SoC). Further, the host memory 2120 may be an embedded memory included in the AP or an NVM or memory module located outside the AP.

The host controller 2110 may manage an operation of storing data (e.g., write data) of a buffer region of the host memory 2120 in the NVM 2220 or an operation of storing data (e.g., read data) of the NVM 2220 in the buffer region.

The storage controller 2210 may include a host interface 2211, a memory interface 2212, and a CPU 2213. The storage controller 2210 may further include a flash translation layer (FTL) 2214, a packet manager 2215, a buffer memory 2216, an error correction code (ECC) engine 2217, and an advanced encryption standard (AES) engine 2218. The storage controller 2210 may further include a working memory in which the FTL 2214 is loaded. The CPU 2213 may execute the FTL 2214 to control data write and read operations on the NVM 2220.

The host interface 2211 may transmit and receive packets to and from the host 2100. A packet transmitted from the host 2100 to the host interface 2211 may include a command or data to be written to the NVM 2220. A packet transmitted from the host interface 2211 to the host 2100 may include a response to the command or data read from the NVM 2220. The memory interface 2212 may transmit data to be written to the NVM 2220 to the NVM2 220 or receive data read from the NVM 2220. The memory interface 2212 may be configured to comply with a standard protocol, such as, for example, Toggle or open NAND flash interface (ONFI).

The FTL 2214 may perform various functions, such as, for example, an address mapping operation, a wear-leveling operation, and a garbage collection operation. The address mapping operation may be an operation of converting a logical address received from the host 2100 into a physical address used to actually store data in the NVM2 220. The wear-leveling operation may be a technique that prevents or reduces excessive deterioration of a specific block by allowing blocks of the NVM 2220 to be uniformly used. As an example, the wear-leveling operation may be implemented using a firmware technique that balances erase counts of physical blocks. The garbage collection operation may be a technique for obtaining usable capacity in the NVM 2220 by erasing an existing block after copying valid data of the existing block to a new block.

The packet manager 2215 may generate a packet according to a protocol of an interface, which consents to the host 2100, or parse various types of information from the packet received from the host 2100. In addition, the buffer memory 2216 may temporarily store data to be written to the NVM 2220 or data to be read from the NVM 2220. Although the buffer memory 2216 is a component included in the storage controller 2210 in FIG. 14, in some embodiments, the buffer memory 2216 may be disposed outside of the storage controller 2210.

The ECC engine 2217 may perform error detection and correction operations on read data read from the NVM 2220. For example, the ECC engine 2217 may generate parity bits for write data to be written to the NVM2 220, and the generated parity bits may be stored in the NVM 2220 together with write data. During the reading of data from the NVM 2220, the ECC engine 2217 may correct an error in the read data by using the parity bits read from the NVM 2220 along with the read data, and output error-corrected read data.

The AES engine 2218 may perform at least one of an encryption operation and a decryption operation on data input to the storage controller 2210 by using a symmetric-key algorithm.

Figure 15:
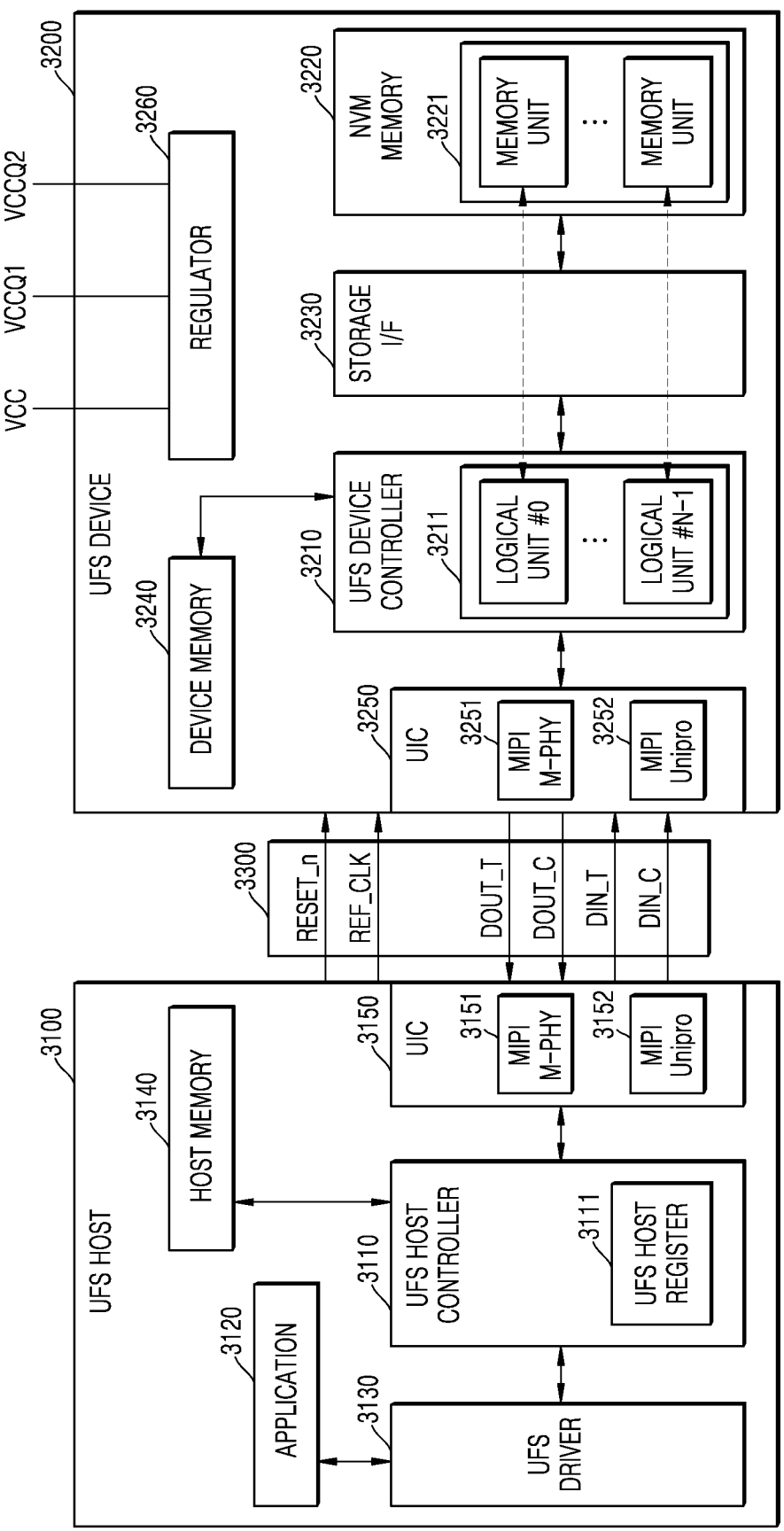
FIG. 15 is a diagram of a universal flash storage (UFS) system according to an embodiment of the inventive concept.

FIG. 15 is a diagram of a UFS system 3000 according to an embodiment of the inventive concept. The UFS system 3000 may be a system conforming to a UFS standard according to Joint Electron Device Engineering Council (JEDEC) and includes a UFS host 3100, a UFS device 3200, and a UFS interface 3300. Aspects of the above description of the computing system 10 of FIG. 1 may also be applied to the UFS system 3000 of FIG. 15, unless the context indicates otherwise. The host 3100 may include at least some element(s) of the host 100 of FIG. 1 and the UFS device 3200 may include at least some element(s) of the storage system 200 of FIG. 1.

Referring to FIG. 15, the UFS host 3100 may be connected to the UFS device 3200 through the UFS interface 3300.

The UFS host 3100 may include a UFS host controller 3110, an application 3120, a UFS driver 3130, a host memory 3140, and a UFS interconnect (UIC) layer 3150. The UFS device 3200 may include the UFS device controller 3210, the NVM 3220, a storage interface 3230, a device memory 3240, a UIC layer 3250, and a regulator 3260. The NVM 3220 may include a plurality of memory units 3221. Although each of the memory units 3221 may include a V-NAND flash memory having a 2D structure or a 3D structure, in some embodiments, each of the memory units 3221 may include another kind of NVM, such as, for example, PRAM and/or RRAM. The UFS device controller 3210 may be connected to the NVM 3220 through the storage interface 3230. The storage interface 3230 may be configured to comply with a standard protocol, such as, for example, Toggle or ONFI.

The application 3120 may refer to a program that communicates with the UFS device 3200 to use functions of the UFS device 3200. The application 3120 may transmit input-output requests (IORs) to the UFS driver 3130 for input/output (I/O) operations on the UFS device 3200. The IORs may refer to, for example, a data read request, a data storage (or write) request, and/or a data erase (or discard) request, without being limited thereto.

The UFS driver 3130 may manage the UFS host controller 3110 through a UFS-host controller interface (UFS-HCI). The UFS driver 3130 may convert the IOR generated by the application 3120 into a UFS command defined by the UFS standard and transmit the UFS command to the UFS host controller 3110. One IOR may be converted into a plurality of UFS commands. Although the UFS command may be defined by an SCSI standard, the UFS command may be a command dedicated to the UFS standard.

The UFS host controller 3110 may transmit the UFS command converted by the UFS driver 3130 to the UIC layer 3250 of the UFS device 3200 through the UIC layer 3150 and the UFS interface 3300. During the transmission of the UFS command, a UFS host register 3111 of the UFS host controller 3110 may serve as a command queue (CQ).

The UIC layer 3150 on the side of the UFS host 3100 may include a mobile industry processor interface (MIPI) M-PHY 3151 and an MIPI UniPro 3152, and the UIC layer 3250 on the side of the UFS device 3200 may also include an MIPI M-PHY 3251 and an MIPI UniPro 3252.

The UFS interface 3300 may include a line configured to transmit a reference clock signal REF_CLK, a line configured to transmit a hardware reset signal RESET_n for the UFS device 3200, a pair of lines configured to transmit a pair of differential input signals DIN_T and DIN_C, and a pair of lines configured to transmit a pair of differential output signals DOUT_T and DOUT_C.

In some embodiments, a frequency of a reference clock signal REF_CLK provided from the UFS host 3100 to the UFS device 3200 may be one of about 19.2 MHz, about 26 MHz, about 38.4 MHz, and about 52 MHz, without being limited thereto. The UFS host 3100 may change the frequency of the reference clock signal REF_CLK during an operation, that is, during data transmission/receiving operations between the UFS host 3100 and the UFS device 3200. The UFS device 3200 may generate clock signals having various frequencies from the reference clock signal REF_CLK provided from the UFS host 3100 by using a phase-locked loop (PLL). Also, the UFS host 3100 may set a data rate between the UFS host 3100 and the UFS device 3200 by using the frequency of the reference clock signal REF_CLK. That is, the data rate may be determined depending on the frequency of the reference clock signal REF_CLK.

The UFS interface 3300 may support a plurality of lanes, each of which may be implemented as a pair of differential lines. For example, the UFS interface 3300 may include at least one receiving lane and at least one transmission lane. In FIG. 15, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 5, the number of transmission lanes and the number of receiving lanes are not limited thereto.

The receiving lane and the transmission lane may transmit data based on a serial communication scheme. Full-duplex communications between the UFS host 3100 and the UFS device 3200 may be enabled due to a structure in which the receiving lane is separated from the transmission lane. That is, while receiving data from the UFS host 3100 through the receiving lane, the UFS device 3200 may transmit data to the UFS host 3100 through the transmission lane. In addition, control data (e.g., a command) from the UFS host 3100 to the UFS device 3200 and user data to be stored in or read from the NVM 3220 of the UFS device 3200 by the UFS host 3100 may be transmitted through the same lane. Accordingly, between the UFS host 3100 and the UFS device 3200, in some embodiments, a separate lane for data transmission is not utilized in addition to a pair of receiving lanes and a pair of transmission lanes.

The UFS device controller 3210 of the UFS device 3200 may control all operations of the UFS device 3200. The UFS device controller 3210 may manage the NVM 3220 by using a logical unit (LU) 3211, which is a logical data storage unit. The number of LUs 3211 may be 8, without being limited thereto. In some embodiments, the data log and the node log described above with reference to FIG. 8 and FIG. 10 may include at least one of the logic units (LU) 3211. For example, a first logic unit (LU) may be included in the data log and a second logic unit (LU) may be included in the node log. The logic unit (LU) 3211 may be referred as a storage region. The UFS device controller 3210 may include an FTL and convert a logical data address (e.g., a logical block address (LBA)) received from the UFS host 3100 into a physical data address (e.g., a physical block address (PBA)) by using address mapping information of the FTL. A logical block configured to store user data in the UFS system 3000 may have a size in a predetermined range. For example, a minimum size of the logical block may be set to 4 Kbyte.

When a command from the UFS host 3100 is applied through the UIC layer 3250 to the UFS device 3200, the UFS device controller 3210 may perform an operation in response to the command and transmit a completion response to the UFS host 3100 when the operation is completed.

As an example, when the UFS host 3100 intends to store user data in the UFS device 3200, the UFS host 3100 may transmit a data storage command to the UFS device 3200. When a response (a 'ready-to-transfer' response) indicating that the UFS host 3100 is ready to receive user data (ready-to-transfer) is received from the UFS device 3200, the UFS host 3100 may transmit user data to the UFS device 3200. The UFS device controller 3210 may temporarily store the received user data in the device memory 3240 and store the user data, which is temporarily stored in the device memory 3240, at a selected position of the NVM 3220 based on the address mapping information of the FTL.

As another example, when the UFS host 3100 intends to read the user data stored in the UFS device 3200, the UFS host 3100 may transmit a data read command to the UFS device 3200. The UFS device controller 3210, which has received the command, may read the user data from the NVM 3220 based on the data read command and temporarily store the read user data in the device memory 3240. During the read operation, the UFS device controller 3210 may detect and correct an error in the read user data by using an ECC engine embedded therein. For example, the ECC engine may generate parity bits for write data to be written to the NVM 3220, and the generated parity bits may be stored in the NVM 3220 along with the write data. During the reading of data from the NVM 3220, the ECC engine may correct an error in read data by using the parity bits read from the NVM 3220 along with the read data, and output error-corrected read data.

In addition, the UFS device controller 3210 may transmit user data, which is temporarily stored in the device memory 3240, to the UFS host 3100. In addition, the UFS device controller 3210 may further include an AES engine. The AES engine may perform at least one of an encryption operation and a decryption operation on data transmitted to the UFS device controller 3210 by using a symmetric-key algorithm.

The UFS host 3100 may sequentially store commands, which are to be transmitted to the UFS device 3200, in the UFS host register 3111, which may serve as a common queue, and sequentially transmit the commands to the UFS device 3200. In this case, even while a previously transmitted command is still being processed by the UFS device 3200, that is, even before receiving a notification that the previously transmitted command has been processed by the UFS device 3200, the UFS host 3100 may transmit a next command, which is on standby in the CQ, to the UFS device 3200. Thus, the UFS device 3200 may also receive a next command from the UFS host 3100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 3221 may include a memory cell array and a control circuit configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information in some embodiments, in other embodiments, each of the memory cells may be a cell configured to store information of 2 bits or more, such as, for example, a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ1, and VCCQ2 may be applied as power supply voltages to the UFS device 3200. The voltage VCC may be a main power supply voltage for the UFS device 3200 and be in a range of about 2.4 V to about 3.6 V. The voltage VCCQ1 may be a power supply voltage for supplying a low voltage mainly to the UFS device controller 3210 and be in a range of about 1.14 V to about 1.26 V. The voltage VCCQ2 may be a power supply voltage for supplying a voltage, which is lower than the voltage VCC and higher than the voltage VCCQ1, primarily to an I/O interface, such as the MIN M-PHY 3251, and be in a range of about 1.7 V to about 1.95 V. The power supply voltages may be supplied through the regulator 3260 to respective components of the UFS device 3200. The regulator 3260 may be implemented as a set of unit regulators respectively connected to different ones of the power supply voltages described above.

As is traditional in the field of the present inventive concept, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

In embodiments of the present inventive concept, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array. In embodiments of the present inventive concept, the 3D memory array includes vertical NAND strings that are vertically oriented such that at least one memory cell is located over another memory cell. The at least one memory cell may include a charge trap layer. The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

While the inventive concept has been particularly shown and described with reference to embodiments thereof, it will be understood that various changes in form and detail may be made therein without departing from the spirit and scope of the inventive concept as defined by the following claims.

What is claimed is:

1. A computing system, comprising:
a storage system configured to store data; and
a host configured to compress a data block of a preset size loaded to a memory, generate a merged block of the preset size by merging a compressed block corresponding to the data block, an identifier of a node block referring the data block, and an offset indicating an index of the data block among at least one data block referred by the node block, and provide the merged block to the storage system.

2. The computing system of claim 1, wherein the host is further configured to transmit a node block indicating the address of the data block to the storage system after the merged block is transmitted to the storage system.

3. The computing system of claim 2, wherein the host is further configured to transmit the node block to the storage system when an interface between the storage system and the host is in an idle state.

4. The computing system of claim 2, wherein a time period in which the merged block is transmitted to the storage system and a time period in which the node block is transmitted to the storage system are discontinuous.

5. The computing system of claim 1, wherein the host is further configured to compress a first part of the data block, and based on a result of comparing a compressed size of the first part with a reference size, compress a second part of the data block which is different from the first part.

6. The computing system of claim 5, wherein the reference size is equal to a sum of a size of the identifier corresponding to the data block, a size of the offset of the data block, and a size of a bit indicating the merged block.

7. The computing system of claim 1, wherein the host is further configured to, in a sudden power-off recovery operation, read the merged block, which is stored in the storage system, and obtain the data block, the identifier corresponding to the data block, and the offset of the data block from the read merged block.

8. The computing system of claim 7, wherein the host is further configured to update a node block corresponding to the data block based on the identifier and the offset that are obtained from the merged block.

9. The computing system of claim 7, wherein the merged block comprises a bit indicating the merged block, and the host is further configured to read a plurality of blocks from a data log of the storage system and search for the merged block among the plurality of blocks based on the bit.

10. A host device, comprising:
a memory that stores data to be written to a storage system or data read from the storage system;
a compression manager circuit configured to compress a data block of a preset size loaded to the memory; and
a file system configured to receive a compressed block corresponding to the data block from the compression manager, generate a merged block by merging the compressed block, an identifier of a node block referring the data block, and an offset indicating an index of the data block among at least one data block referred by the node block, and write the merged block to the storage system.

11. The host device of claim 10, wherein a size of the data block and a size of the merged block are equal to each other.

12. The host device of claim 10, wherein the file system is further configured to generate a node block indicating an address of the merged block, and transmit the node block to the storage system in a time period that is discontinuous from a time period in which the data block is transmitted to the storage system.

13. The host device of claim 10, wherein the compression manager is further configured to:
compress a first part of the data block,
compress a second part of the data block which is different from the first part based on a result of comparing a compressed size of the first part with a reference size, and
selectively provide the compressed block or a compression failure signal to the file system, based on a result of comparing the compressed size of the first part with the reference size,
wherein the file system is further configured to:
transmit the compressed block and a write command for the compressed block to the storage system, upon receipt of the compressed block; and
transmit the data block, a node block indicating an address of the data block, and write commands for the data block and the node block to the storage system, upon receipt of the compression failure signal.

14. The host device of claim 10, wherein the file system is configured to generate the merged block by further merging a bit indicating the merged block.

15. The host device of claim 14, wherein the file system is further configured to, in a sudden power-off recovery operation, read the merged block, which is stored in the storage system, and generate the data block and a node block indicating the address of the data block from the read merged block.

16. The host device of claim 15, wherein the file system is further configured to read a plurality of blocks from a data log of the storage system and search for the merged block among the plurality of blocks based on the bit.

17. A computing system, comprising:
a universal flash storage (UFS) system comprising a plurality of storage regions; and
a UFS host configured to store a merged block into which a compressed block in which a data block is compressed, an identifier of a node block referring the data block, and an offset indicating an index of the data block among at least one data block referred by the node block are merged, in a first storage region among the plurality of storage regions, and store a node block indicating the address of the data block in a second storage region among the plurality of storage regions.

18. The computing system of claim 17, wherein a time period in which the merged block is transmitted to the UFS system and a time period in which the node block is transmitted to the UFS system are discontinuous.

19. The computing system of claim 17, wherein a size of the data block and a size of the merged block are equal to each other.

20. The computing system of claim 17, wherein the UFS host is further configured to, generate the merged block by further merging a bit indicating the merged block, in a sudden power-off recovery operation, read the merged block, which is stored in the first storage region, and generate the data block and the node block indicating the address of the data block from the read merged block.

* * * * *